(12) United States Patent
Hallak et al.

(10) Patent No.: US 11,240,306 B2
(45) Date of Patent: Feb. 1, 2022

(54) SCALABLE STORAGE SYSTEM

(71) Applicant: Vast Data Ltd., Herzliya (IL)

(72) Inventors: Renen Hallak, Tenafly, NJ (US); Asaf Levy, Tel Aviv (IL); Avi Goren, Tel Aviv (IL); Alon Horev, Tel Aviv (IL)

(73) Assignee: Vast Data Ltd., Herzliya (IL)

( * ) Notice: Subject to any disclaimer, the term of this patent is extended or adjusted under 35 U.S.C. 154(b) by 220 days.

(21) Appl. No.: 15/804,329

(22) Filed: Nov. 6, 2017

(65) Prior Publication Data

US 2019/0141128 A1    May 9, 2019

(51) Int. Cl.
*H04L 29/08*    (2006.01)
*H04L 12/931*    (2013.01)

(52) U.S. Cl.
CPC ........ *H04L 67/1097* (2013.01); *H04L 49/351* (2013.01)

(58) Field of Classification Search
CPC ................. H04L 67/1097; H04L 49/351
See application file for complete search history.

(56) References Cited

U.S. PATENT DOCUMENTS

| | | | |
|---|---|---|---|
| 7,213,021 B2* | 5/2007 | Taguchi | G06F 3/0605 |
| 9,069,710 B1* | 6/2015 | Modukuri | G06F 3/0607 |
| 9,754,009 B2 | 9/2017 | Sivasubramanian et al. | |
| 10,152,481 B1* | 12/2018 | Singh | G06F 16/13 |
| 10,459,664 B1* | 10/2019 | Dreier | G06F 11/1458 |
| 10,817,392 B1* | 10/2020 | McAuliffe | G06F 11/1461 |
| 11,032,259 B1* | 6/2021 | Bernat | H04L 63/0428 |
| 11,093,146 B2* | 8/2021 | Karr | G06F 3/0635 |
| 2006/0248245 A1 | 11/2006 | Ninomiya et al. | |
| 2009/0125669 A1* | 5/2009 | Gupta | G06F 11/1435 711/103 |
| 2010/0115174 A1* | 5/2010 | Akyol | G06F 13/385 710/316 |
| 2014/0115579 A1 | 4/2014 | Kong | |
| 2014/0156903 A1 | 6/2014 | Chang | |
| 2014/0330787 A1* | 11/2014 | Modukuri | G06F 11/20 707/659 |

(Continued)

FOREIGN PATENT DOCUMENTS

| | | |
|---|---|---|
| EP | 2883147 B1 | 6/2017 |
| WO | 2002052417 A1 | 7/2002 |

OTHER PUBLICATIONS

Sundby, Nick, and Donna Taylor. "Beyond capacity: storage architecture choices for the modern datacenter." White Paper, IDC Analyze the Future, Sponsored by: Toshiba (2014).*

(Continued)

*Primary Examiner* — Jimmy H Tran
(74) *Attorney, Agent, or Firm* — M&B IP Analysts, LLC

(57) ABSTRACT

A large-scale storage system is provided. The large-scale system includes a plurality of compute nodes; a plurality of storage nodes; and a communication fabric for providing a communication infrastructure between the plurality of compute nodes and the plurality of storage nodes; wherein each compute node of the plurality of compute nodes is configured to independently perform at least a storage operation on any of the storage nodes in a persistent manner, and wherein each storage node of the plurality of storage nodes provides physical storage space of the large-scale storage system.

33 Claims, 5 Drawing Sheets

(56) References Cited

U.S. PATENT DOCUMENTS

| | | | |
|---|---|---|---|
| 2015/0227603 A1* | 8/2015 | Zalpuri | G06F 16/178 707/614 |
| 2015/0248366 A1* | 9/2015 | Bergsten | G06F 3/067 710/308 |
| 2015/0281360 A1* | 10/2015 | Lacapra | H04L 67/02 709/203 |
| 2016/0085718 A1* | 3/2016 | Huang | H04L 29/08 709/213 |
| 2016/0239239 A1 | 8/2016 | Tin et al. | |
| 2016/0313934 A1* | 10/2016 | Isherwood | G06F 3/0689 |
| 2016/0378845 A1* | 12/2016 | Sivasubramanian | G06F 9/5061 707/736 |
| 2016/0380854 A1* | 12/2016 | Gaddis | G06F 3/0605 709/224 |
| 2017/0090779 A1 | 3/2017 | Barzik et al. | |
| 2017/0147497 A1 | 5/2017 | Phelan et al. | |
| 2017/0149890 A1 | 5/2017 | Shamis et al. | |
| 2017/0177222 A1* | 6/2017 | Singh | G06F 3/061 |
| 2017/0220506 A1 | 8/2017 | Brown et al. | |
| 2017/0251058 A1 | 8/2017 | Zachariassen et al. | |
| 2017/0286144 A1 | 11/2017 | Barzik et al. | |
| 2018/0095872 A1* | 4/2018 | Dreier | G06F 3/067 |
| 2018/0095915 A1* | 4/2018 | Prabhakar | G06F 9/455 |
| 2018/0188985 A1* | 7/2018 | Wysocki | G06F 12/0866 |
| 2018/0260125 A1* | 9/2018 | Botes | G06F 3/0617 |
| 2018/0260135 A1* | 9/2018 | Hayashida | G06F 13/4282 |
| 2018/0356989 A1* | 12/2018 | Meister | G06F 3/0649 |
| 2018/0357018 A1* | 12/2018 | Karr | G06F 11/0793 |
| 2019/0220919 A1* | 7/2019 | Martinez | G07G 1/0036 |
| 2019/0347010 A1* | 11/2019 | Frolikov | G06F 3/0688 |
| 2019/0361610 A1* | 11/2019 | Frolikov | G06F 3/0652 |
| 2019/0391872 A1* | 12/2019 | Kirkpatrick | G06F 11/1076 |
| 2020/0045111 A1* | 2/2020 | Kannan | G06F 3/0611 |
| 2020/0073559 A1* | 3/2020 | Kirkpatrick | G06F 3/0613 |
| 2020/0089182 A1* | 3/2020 | Rosca | G06F 16/1873 |
| 2020/0117534 A1* | 4/2020 | Yurzola | G06F 3/0683 |
| 2020/0151142 A1* | 5/2020 | Mamidi | G06F 16/172 |
| 2020/0241749 A1* | 7/2020 | Freyensee | G06F 3/0683 |
| 2020/0257449 A1* | 8/2020 | Frolikov | G06F 3/0664 |
| 2021/0141630 A1* | 5/2021 | Sharpe | G06F 3/0619 |
| 2021/0160318 A1* | 5/2021 | Sajeepa | G06F 11/1068 |
| 2021/0173588 A1* | 6/2021 | Kannan | G06F 11/3419 |
| 2021/0182190 A1* | 6/2021 | Gao | G06F 12/0269 |
| 2021/0243255 A1* | 8/2021 | Perneti | G06F 3/0619 |
| 2021/0286517 A1* | 9/2021 | Karr | G06F 3/0631 |
| 2021/0286546 A1* | 9/2021 | Hodgson | G06F 3/0653 |

OTHER PUBLICATIONS

Bagui, Sikha, and Loi Tang Nguyen. "Database sharding: to provide fault tolerance and scalability of big data on the cloud." International Journal of Cloud Applications and Computing (IJCAC) 5.2 (2015): 36-52.*

International Search Report and Written Opinion of International Searching Authority for PCT/US2017/060175, ISA/RU, Moscow, Russia, dated Aug. 10, 2018.

A Partial Supplementary European Search Report for European Patent Application No. 17930897.8, dated Feb. 16, 2021, EPO, Munich, Germany.

* cited by examiner

SCALABLE STORAGE SYSTEM

TECHNICAL FIELD

The present disclosure generally relates to the field of data storage, and more particularly to large-scale storage systems.

BACKGROUND

A data center is a large group of networked computer servers typically used by organizations for the remote storage, processing, or distribution of large amounts of data. Traditionally, a data center is arranged using four different networks: a wide area network (WAN) providing connectivity to and from the data center, a local area network (LAN) providing connectivity among the servers of the data center, a storage area network (SAN) providing connectivity between the servers to the storage system, and an internal storage fabric for connecting the various storage elements (e.g., disks). With the advancements in networking technologies, the traditional arrangement of data centers may not provide the optimal performance. For example, using 2 different connectivity types between components of the data centers is an inefficient configuration.

Advanced technologies of solid state persistent drives (SSDs), such as Flash and NVRAM, provide reliable and faster alternatives to traditional magnetic hard drives. The disadvantage of SSDs is their price. Thus, such persistent media is not typically used to backup or archive applications. Further, in servers and storage systems installed in data centers, enterprise grade SSDs are utilized, which ensure a high number of write-erase cycles. Such enterprise grade SSDs are relatively expensive.

To keep up with the demand for storage and performance in data centers, software defined storage (SDS) has been introduced. Software defined storage refers to computer data storage technologies which separate storage hardware from the software that manages the storage infrastructure. The software implements policy management for operation including deduplication, replication, snapshots, and backup. With software defined storage technologies, the requirement of flexible adjustment of infrastructure can be fulfilled.

In a typical arrangement of a software defined storage solution, the storage drives are attached directly to servers executing the storage software (logic). This is inefficient from a physical space perspective, because servers are transitioning to smaller form factors and have less room to house storage drives. Further, a server attached to multiple storage drives can cause a single point of failure, i.e., causing inaccessibility to all the drives which are attached to it.

Another major disadvantage of software defined storage solution is the fact that the computing and storage resources are coupled. That is, increasing the computing resources to achieve better performance would require increasing the number of storage drives (e.g., as part of the sever). Similarly, increasing the storage drives to increase the available storage would require increasing the number of severs.

It would therefore be advantageous to provide a storage system operable as a storage solution that would overcome the deficiencies noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a large-scale storage system, comprising: a plurality of compute nodes; a plurality of storage nodes; and a communication fabric for providing a communication infrastructure between the plurality of compute nodes and the plurality of storage nodes; wherein each compute node of the plurality of compute nodes is configured to independently perform at least a storage operation on any of the storage nodes in a persistent manner, and wherein each storage node of the plurality of storage nodes provides physical storage space of the large-scale storage system.

Certain embodiments disclosed herein also include a method for performing a write request in a large-scale storage system. The method comprises receiving, by a compute node of the large-scale storage system, a write request, wherein the write request includes at least a data element to be written; determining a location to write the received data element, wherein the location is in at least one storage node of the large-scale storage system; writing the data element to a write buffer at the determined location; and receiving, at the compute node, an acknowledgment upon writing the data element to the write buffer.

Certain embodiments disclosed herein also include a method for performing a read request in a large-scale storage system. The method comprises receiving at a compute node of the large-scale storage system a read request, wherein the read request includes at least an identifier of a data element to be read; determining data blocks of the requested data element; determining a location of the data blocks, wherein the location is in at least one storage node of the large-scale storage system; and accessing the determined location to retrieve the data blocks of the requested element.

Certain embodiments disclosed herein include a method for performing a read request in a large-scale storage system. The method comprises receiving at a compute node of the large-scale storage system a read request, wherein the read request includes at least an identifier of a data element to be read; determining data blocks of the requested data element; determining a location of the data blocks, wherein the location is in at least one storage node of the large-scale storage system; and accessing the determined location to retrieve the data blocks of the requested element.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
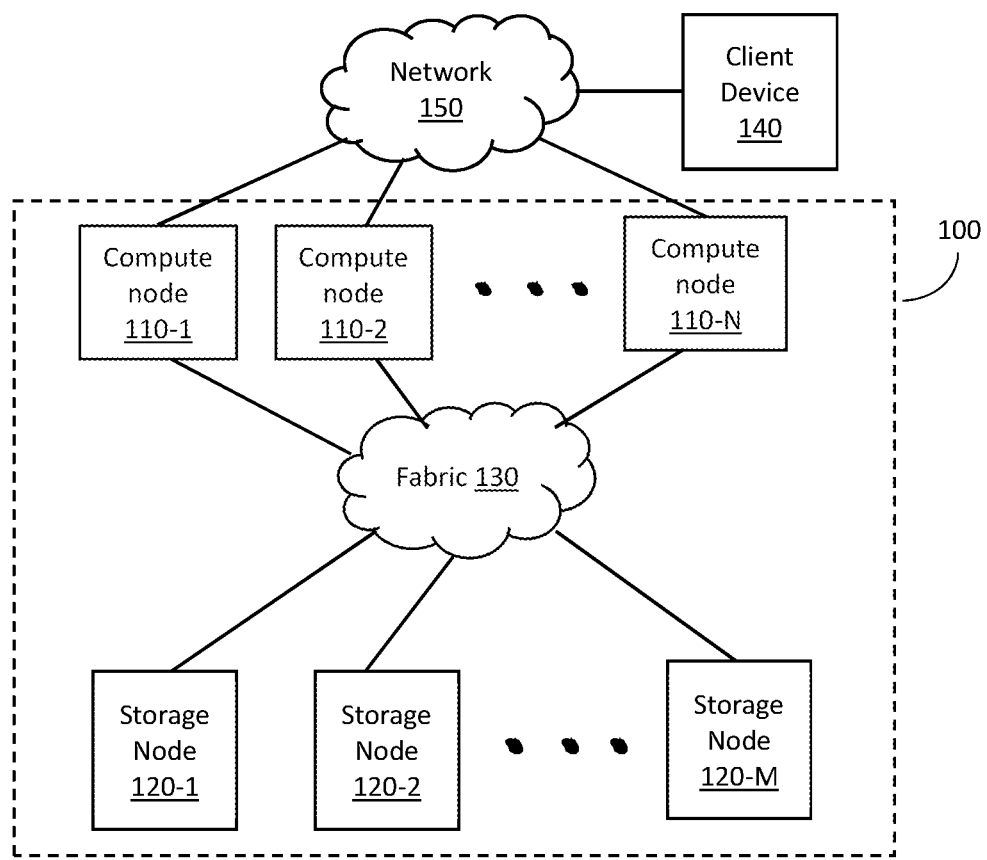
FIG. 1 is a network diagram utilized to describe a large-scale storage system according to the various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

According to the disclosed embodiments, a large-scale storage system is disclosed. The system includes at least one compute node communicatively connected to at least one storage node over a communication fabric. The arrangement of the disclosed large-storage system provides a disaggregated software-defined storage architecture, where the computing and storage resources are decoupled.

As will be discussed in greater detail below, each storage node in the system may include a plurality of consumer grade solid state drives (SSDs). Utilizing SSDs allows for fast and random access read and write operations. The compute node is configured to control the write operations so that a lower number of write-erase cycles are performed with each SSD, thereby enlarging the life time of each SSD. As a result, low-grade (and low cost) SSDs can be utilized, thereby reducing the overall cost of the system.

FIG. 1 shows an example diagram of a large-scale storage system 100 according to the disclosed embodiments. The storage system 100 includes a number of N compute nodes 110-1 through 110-N (hereinafter referred to individually as a compute node 110 and collectively as compute nodes 110, merely for simplicity purposes, N is an integer equal to or greater than 1), a number of M storage nodes storage node 120-1 through 120-M (hereinafter referred to individually as a storage node 120 and collectively as storage nodes 120, merely for simplicity purposes, M is an integer equal to or greater than 1). The computer nodes 110 and the storage nodes 120 are connected through a communication fabric 130.

In an embodiment, a compute node 110 may be realized as a physical machine or a virtual machine. A physical machine may include a computer, a sever, and the like. A virtual machine may include any virtualized computing instance (executed over a computing hardware), such as a virtual machine, a software container, and the like.

It should be noted that in both configurations (physical or virtual), the compute node 110 does not require any dedicated hardware. An example arrangement of a compute node 110 is provided in FIG. 3.

A compute node 110 is configured to perform tasks related to the management of the storage nodes 120. In an embodiment, each compute node 110 interfaces with a client device 140 (or an application installed therein) via a network 150. To this end, a compute node 110 is configured to receive requests (e.g., read or write requests) and promptly serve these requests in a persistent manner. The network 150 may be, but is not limited to, the Internet, the world-wide-web (WWW), a local area network (LAN), a wide area network (WAN), and the like.

In an embodiment, a compute node 110 is configured to interface with different protocols implemented by the client devices or applications (e.g., HTTP, FTP, etc.) and to manage the read and write operations from the storage nodes 120. The compute node 110 is further configured to translate the protocol commands into a unified structure (or language). Then, each compute node 110 is also configured to logically address and map all elements stored in the storage nodes 120.

Further, each compute node 110 maintains the logical operations of elements and the relationships between the elements (for example, directory trees) and an element attribute (e.g., metadata) via state stored on the storage nodes 120. An element may include a file, a directory, an object, and the like. The mapping and addressing of the elements allow the compute node 110 to maintain the exact physical locations of the elements in the storage nodes 120.

In an embodiment, to efficiently read and write data to the storage nodes 120 from the physical layer, each compute node 110 performs a number of processes including data reduction, data resiliency, and Flash memory management actions (e.g., defrag, wear leveling, and so on).

It should be noted that each compute node 110 operates in the same manner as all other compute nodes 110. In a case of a failure, any compute node 110 can replace the failed node. Further, each compute node can control and mange one or mode storage nodes 120 regardless of the specific architecture of the storage nodes 120. Therefore, there is no coupling between the compute nodes 110 and the storage nodes 120. As such, compute nodes can be added to the system 100 without increasing the number of storage nodes (or their capacity), and vice versa, storage nodes can be added without increasing the number of compute nodes 110.

In order to allow scalability of the system 100, the compute nodes 110 do not communicate with each other to serve application requests. Further, each compute node 110 may be independently upgraded, installed with a different software version, or both.

The storage nodes 120 provide the storage and state in the large-scale system 100. To this end, each storage node 120 includes a plurality of consumer grade SSDs which are relatively inexpensive. Such type of SSDs suffer from a number of drawbacks. Specifically, the SSDs provide poor endurance, data integrity, write latency, power protection, parallel writes, and garbage collection. The critical drawback in using consumer grade SSDs is the endurance, which means that such drives have significantly less write-erase cycles than enterprise grade drives.

According to the disclosed embodiments, discussed in more detail below, the operations for writing and deleting data to the SSDs are controlled to reduce the number of write-erase cycles, thereby ensuring enterprise grade performance with consumer grade SSDs.

The storage nodes 120 may be configured to have the same capacity as each other or different capacities from each other. In an embodiment, the data stored in each storage node 120 is made redundant internally within the storage node, made redundant at a different storage node, or both. As will be discussed below with reference to FIGS. 2A and 2B, each storage node 120 further includes a non-volatile random-access memory (NVRAM) and an interface module for interfacing with the compute nodes 110.

The storage node 120 communicates with the compute nodes 110 over the communication fabric 130. It should be noted that each compute node 110 can communicate with each storage node 120 over the communication fabric 130. There is no direct coupling between a compute node 110 and storage node 120.

In the embodiment, the communication fabric 130 may include an Ethernet fabric, an Infiniband fabric, and the like. Specifically, the communication fabric 130 may enable communication protocols such as, but not limited to, remote direct memory access (RDMA) over Converged Ethernet (RoCE), iWARP, Non-Volatile Memory Express (NVMe), and the like. It should be noted that the communication protocols discussed herein are provided merely for example purposes, and that other communication protocols may be equally utilized in accordance with the embodiments disclosed herein without departing from the scope of the disclosure.

It should be noted that in one example deployment, the client device 140 is part of a computer node 110. In such a deployment, the system 100 does not communicate with an external network, e.g., the network 150. It should be further noted that the communication between the compute nodes 110 and the storage nodes 120 is always facilitated over the fabric 130. It should be further noted that the compute nodes 120 can communicate with each other over the fabric 130. The fabric 130 is a shared fabric.

Figure 2A:
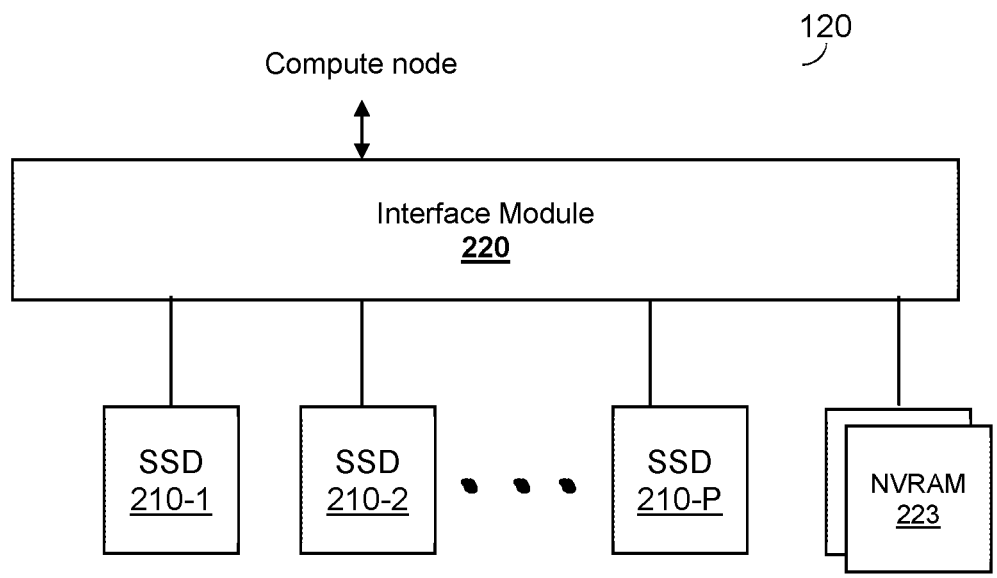
FIG. 2A is an example block diagram of a storage node according to an embodiment.

FIG. 2A shows an example block diagram illustrating a storage node 120 according to an embodiment. The storage node 120 includes a plurality of SSDs 210-1 through 210-P (hereinafter referred to individually as a SSD 210 and collectively as SSDs 210, merely for simplicity purposes), at least one NVRAM, and an interface module 220. In some configurations, two interface modules 220 are provided for redundancy. As noted above, the SSDs 210 may be consumer grade SSDs. The number of SSDs, the configurations of the SSDs, and the capacities of the SSDs may be different from one storage node 210 to another as well as within a storage node 210. The SSDs 210 are placed in an enterprise enclosure (rack) adapted to host SSDs having a consumer grade form factor. For example, the enterprise grade form factor is customarily 2.5" to fit enterprise enclosures expectations, whereas the low-cost consumer grade SSDs' form factor is M.2. To bridge the form factor differences, a number of SSDs may be placed in a single slot of an enterprise enclosure.

According to the disclosed embodiments, the NVRAM 223 is utilized to reduce the number of write accesses to the SSDs 210 and the write amplification. According to an embodiment, data is written first to the NVRAM 223, which returns an acknowledgement after each such data write. Then, during a background process, the data is transferred from the NVRAM 223 to the SSDs 210. The data is kept in the NVRAM 223 until the data is completely written to the SSDs 210. Furthermore, this writing procedure ensures no data is lost when power is off.

As the NVRAM 223 supports low write latency and parallel writes, the entire storage node 120 supports these features. Specifically, the low latency is achieved by acknowledging the write request once the data is saved to the NVRAM 223. The parallel writes are achieved by serving multiple concurrent write requests by the NVRAM 223 and, during the background process, independently fulfilling such requests by saving the data into the SSDs 210.

In an embodiment, the NVRAM 223 is utilized to perform an efficient garbage collection process under the control of a compute node 110. Typically, such a process frees blocks for erasure and subsequent writes. In consumer grade SSDs, the garbage collection is weak and contributes to slow SSD responsiveness. To improve the garbage collection process, write requests from multiple client devices (not shown) are aggregated until a complete data block is ready. Then, complete data blocks are saved in the SSDs 210. As such, the amount of "wasted" storage space is minimized and, thus, the operation of the garbage collection process is simplified. It should be noted that the NVRAM 223 may be, for example, 3D Xpoint, or any non-volatile memory (NVM) device.

Figure 2B:
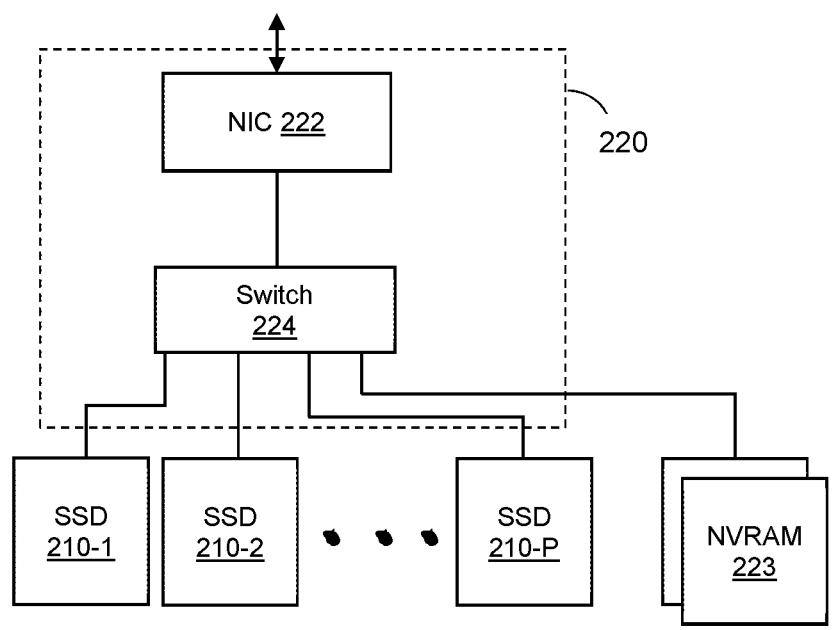
FIG. 2B is an example block diagram of an interface module of a storage node according to an embodiment.

FIG. 2B shows an example block diagram of an interface module 220. In an example embodiment, an interface module 220 includes a network interface card (NIC) 222 and a switch 224 connected through an internal bus (not shown), e.g., a PCIe bus.

The NIC 222 allows the communication of the storage node 120 with the compute nodes (110, FIG. 1) over the communication fabric (130, FIG. 1). The NIC 222 may allow communication via at least one of the protocols discussed above.

The switch 224 allows the connection of the multiple SSDs 210 and NVRAM 223 to and NIC 222. In an example embodiment, the switch 224 is a PCIe switch. In another embodiment, more than one PCIe switch is utilized to support more connectivity to the SSDs. In some configurations, where non PCIe SSDs 210 are available (e.g., Ethernet SSDs), the switch 224 may be a non PCIe switch, for example an Ethernet switch.

According to the disclosed embodiments, a storage node 110 is designed to support data resiliency even when using consumer grade SSDs that are typically prone to failures. When a SSD 210 fails, data cannot be read from or written to the SSD. According to embodiment, the resiliency scheme protecting against SSD failures is based on an N+K erasure correction scheme. That is, for every 'N' data SSDs, 'K' redundancy SSDs are utilized, where N and K are integer numbers. It should be appreciated that this resiliency scheme offers increased redundancy and decreased capacity overhead as the system grows.

In another embodiment, a data reduction process is managed by any compute node 110, in order to save on physical storage space. To this end, data from client devices are written to the NVRAM 223 as they are received, i.e., in uncompressed or locally compressed manner. Then, as part of the background process, the data is globally compressed and saved to the SSDs 210. As noted above, once a data block is completely written to the SSDs 210, such data block is deleted from the NVRAM 223.

The compression may include proactively inspecting data to detect duplicates, and eliminating such duplicates. The duplicates detection may be at the block level and at the byte level inside a block. It should be noted that the compression does not increase the latency, as the write request is acknowledged when the data is saved in the NVRAM 223.

Figure 3:
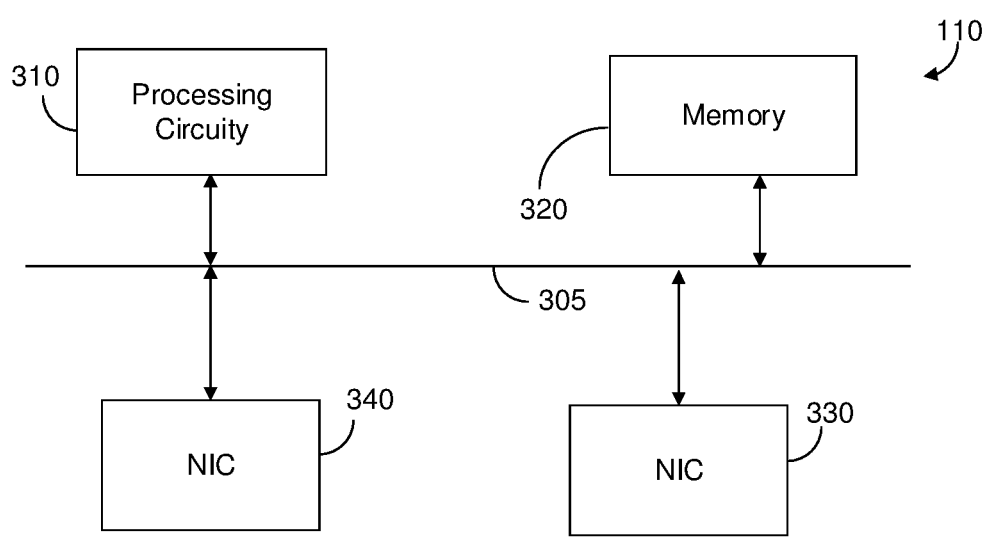
FIG. 3 is an example block diagram of a compute node according to an embodiment.

FIG. 3 shows an example block diagram illustrating a compute node 110 according to an embodiment. The compute node 110 includes a processing circuitry 310, a memory 320, a first network interface controller (NIC) 330 and a second NIC 340. In an embodiment, the components of the compute node 110 may be communicatively connected via a bus 305.

The processing circuitry 310 may be realized as one or more hardware logic components and circuits. For example, and without limitation, illustrative types of hardware logic components that can be used include FPGAs, ASICs, ASSPs, SOCs, general-purpose microprocessors, microcontrollers, DSPs, and the like, or any other hardware logic components that can perform calculations or other manipulations of information.

The memory 320 may be volatile (e.g., RAM, etc.), non-volatile (e.g., ROM, flash memory, etc.), or a combination thereof. In one configuration, computer readable instructions or software to implement one or more processes performed by compute node 110 may be stored in the memory 320. Software shall be construed broadly to mean any type of instructions, whether referred to as software, firmware, middleware, microcode, hardware description language, or otherwise. Instructions may include code (e.g., in source code format, binary code format, executable code format, or any other suitable format of code).

The first NIC 330 allows the compute node 110 to communicate with the storage nodes via the communication fabric 130 (see FIG. 1) to provide remote direct memory access to data stored in the storage nodes. In an embodiment, the first NIC 130 may enable communication via RDMA protocols such as, but not limited to, Infiniband, RDMA over Converged Ethernet (RoCE), iWARP, and the like.

The second NIC 340 allows the compute node 110 to communicate with client devices (e.g., client device 140, FIG. 1) through a communication network (e.g., the network 150, FIG. 1). Examples for such a network includes, but is not limited to, the Internet, the world-wide-web (WWW), a local area network (LAN), a wide area network (WAN), and the like. It should be appreciated that in some configurations, the compute node 110 may include a single NIC. This configuration is applicable when, for example, the fabric is shared.

Various functions of the large-scale system will be discussed with reference to the elements described in FIGS. 1-3.

As any storage system, the disclosed large-scale storage system 100 supports data flows including, but not limited to, write and read. According to the disclosed embodiments, the read and write data flows are performed in a synchronous manner. A data flow starts when a request is received at a compute node 110 and ends when a reply indicating the completion of the request is sent back to a client device 140. All data flows are performed in a persistent manner. That is, no data is lost in case of a failure in one of the compute nodes 110 or in one of the storage nodes 120.

According to the disclosed embodiments, every compute node 110 can access the entire namespace, while each storage node 120 is responsible for a specific (predefined) range of the namespace, i.e., the large-scale storage system 100 implements a sharding mechanism. Further, each compute node 110 implements persistent locks on storage nodes 120 so as to ensure that data flows, and specifically write requests, are synchronously performed such that data integrity is maintained. Data is sharded on a NVRAM 223 according to element handles and according to offset ranges, namespace ranges, or both, that a respective storage node 210 handles. The shard count is constant regardless of the size of the system, thus, in smaller systems, multiple shards will reside on the same NVRAM 223.

Figure 4:
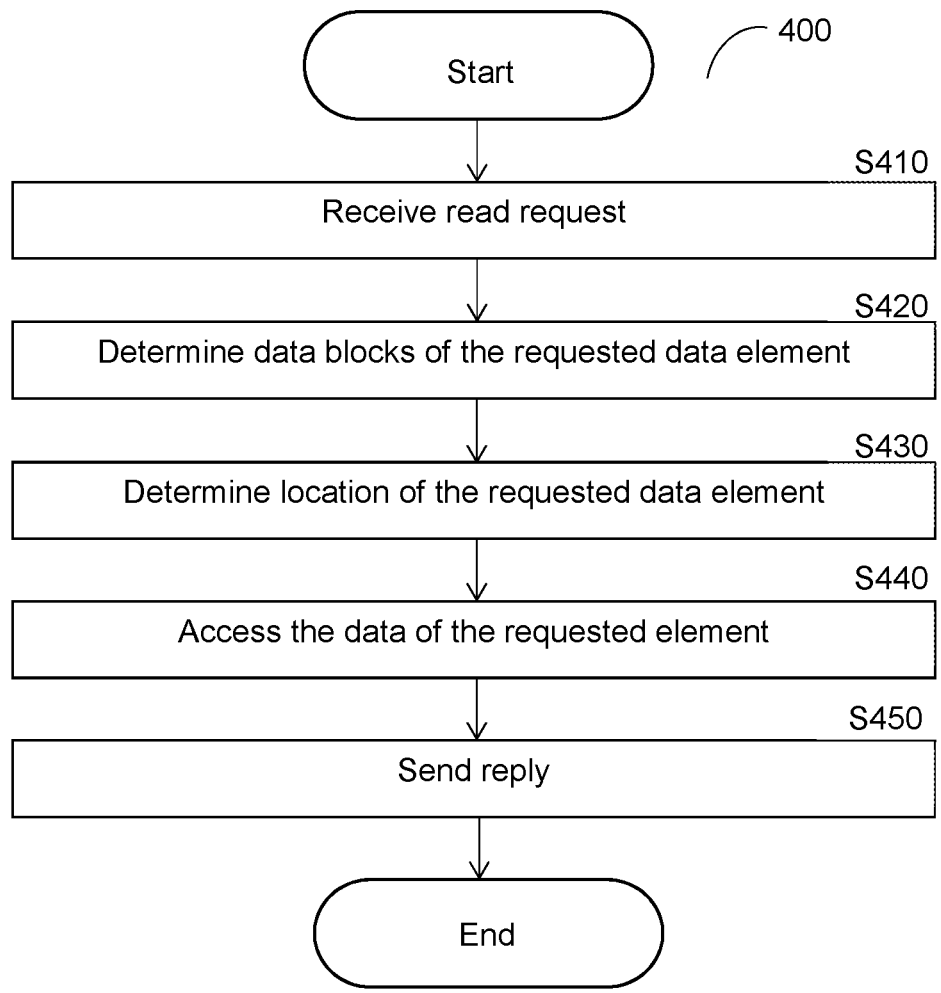
FIG. 4 is an example flowchart of a method for performing a read request in a large-scale storage system according to an embodiment.

FIG. 4 shows an example flowchart 400 illustrating a method for performing a read request in the large-scale storage system 100 according to an embodiment. In an embodiment, the method illustrated in FIG. 4 is performed by a compute node 110.

At S410, a read request is received from a client device. Such a request typically includes an identifier of a data element to be read. As noted above, an element may include a file, a directory, an object, and the like.

At S420, the data blocks of the requested data element are determined. For example, the data blocks may be a file, a portion of a file, directory or a file in a directory, and so on.

At S430, the location of the requested data element is determined. The location is one of more storage nodes 120. In each storage node 120, the data element can be saved in the NVRAM 223 or one or more of the SSDs 210. In an embodiment, the location is determined using tokens.

A token is an abstraction representing a pointer to a block of data or metadata. A token may be one of three types: direct, mapper, or data reducer. A direct token holds the physical address where a data block is kept (on NVRAM or SSD). A mapper token is used to retrieve the physical address from the NVRAM. The mapper token is given to a mapping table to retrieve the physical address. A data reducer token is used to retrieve the physical address from the interface module. The type of token to be used depends on the data to be read. For example, data blocks either have direct or data reducer tokens. Metadata blocks have direct or mapper tokens.

At S440, using the determined location, the data of the requested element is accessed and retrieved from the storage node(s) storing such data. In some cases, an attempt to access the location may not be successful, for example, due to a failure of the accessed storage node or SSDs. In such cases, the data cannot be read from the determined location. In order to serve the read request, a collection of one or more backup SSDs are determined based on the resiliency scheme and the information is read and decoded from such SSD(s). This solution works fine when the SSD is inaccessible. When the entire storage node is inaccessible, and the collection of redundant SSDs needed reside on that same storage node, an error message is returned.

In another embodiment, a checksum mechanism is employed on the retrieved data to ensure that such data is not corrupted. If the retrieved data is corrupted, the data is read again from the redundant SSD(s) determined by the resiliency scheme.

At S450, a reply including the retrieved data is generated and sent to the client device.

Figure 5:
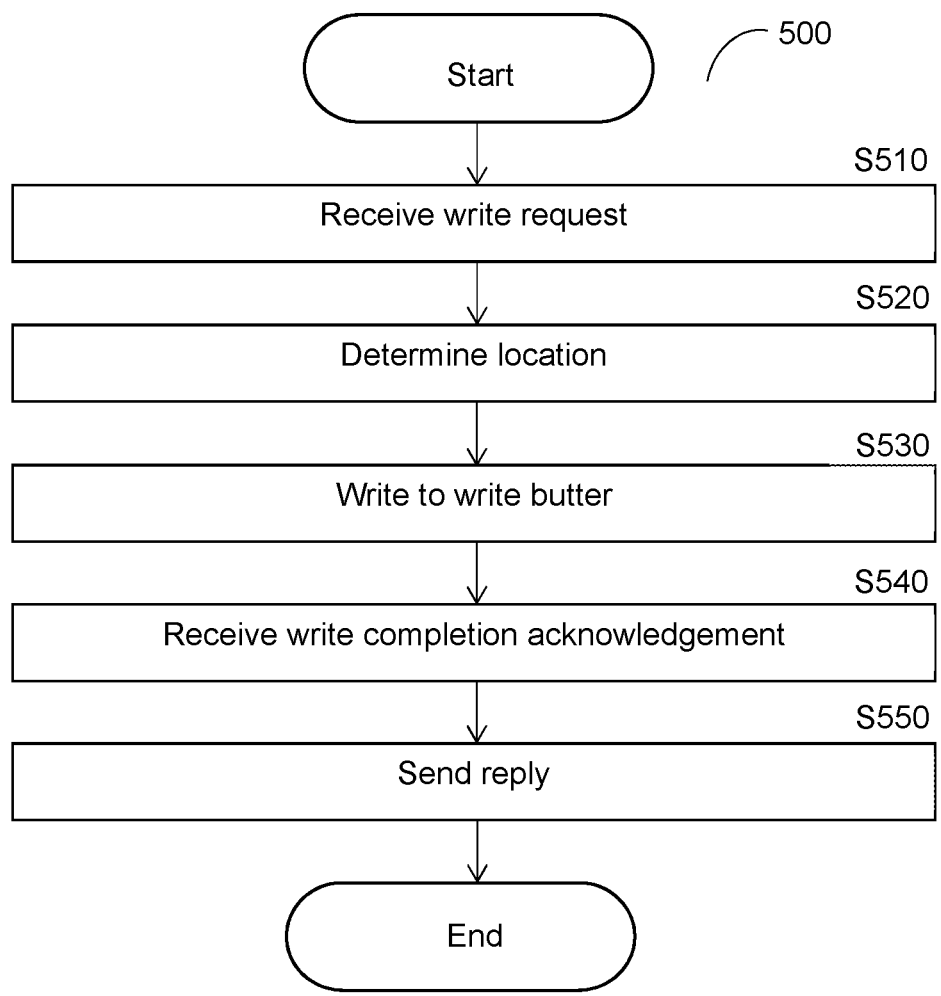
FIG. 5 is an example flowchart of a method for performing a write request in a large-scale storage system according to an embodiment.

FIG. 5 shows an example flowchart 500 illustrating a method for performing a write request in the large-scale storage system 100 according to an embodiment. In an embodiment, the method illustrated in FIG. 5 is performed by a compute node 110.

At S510, a write request is received from a client device. Such a request typically includes a data element to be written to the storage nodes. As noted above, an element may include a file, a directory, an object, and the like.

At S520, the location for writing the requested element is determined. The location is a location of one or more storage nodes 120, and more specifically of a NVRAM 223 in a storage node. In an embodiment, S520 further includes determining the shard allocated to the received data element and a NVRAM that the determined shard resides on. As an example, the location (of the shard, the NVRAM, or both) can be determined using a hash table mapping an element handler to its physical storage destination. It should be noted that, in some cases, the determined location can be spread over a number of NVRAMs across a number of storage nodes. This would be the case if there is not enough space is one NVRAM.

At S530, the element data is written to a write butter at the determined location. The write buffer ensures that a complete data block is flushed to the SSDs 210. Any new data during a predefined time window is written to the SSDs. In some embodiments, S530 includes allocating space in the write buffer. In yet another embodiment, S530 further includes updating a pointer to the data location in the buffer and other data structures used to indicate the occupancy of the NVRAM.

According to yet another embodiment, S530 includes locking the NVRAM (write buffer) when element data is written and pointers/data structures are updated. The locks are released once the write to NVRAM is completed. The locks may be local or global locks.

At S540, a write completion acknowledgement is received. Such an acknowledgement is received from the storage node upon completion of the write to the NVRAM.

At S550, a reply is sent to the client indicating that the write request has been completed.

The write request processing as discussed with reference to FIG. 5 is a synchronous flow. The data in the write buffer or NVRAM is saved to the SSDs in an asynchronous manner. The data is migrated from the NVRAM to SSDs when the data in the NVRAM reaches a predefined threshold.

Prior to migrating the data from the NVRAM, a data reduction process is performed to reduce the size of the data. Further, a resiliency scheme is applied to save the data in multiple locations.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise a set of elements comprises one or more elements. In addition, terminology of the form "at least one of A, B, or C" or "one or more of A, B, or C" or "at least one of the group consisting of A, B, and C" or "at least one of A, B, and C" used in the description or the claims means "A or B or C or any combination of these elements." For example, this terminology may include A, or B, or C, or A and B, or A and C, or A and B and C, or 2A, or 2B, or 2C, and so on.

All examples and conditional language recited herein are intended for pedagogical purposes to aid the reader in understanding the principles of the disclosed embodiments and the concepts contributed by the inventor to furthering the art, and are to be construed as being without limitation to such specifically recited examples and conditions. Moreover, all statements herein reciting principles, aspects, and embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A large-scale storage system, comprising:
   a plurality of compute nodes each compute node including at least one processing circuitry;
   a plurality of storage nodes; and
   a communication fabric for providing a communication infrastructure between the plurality of compute nodes and the plurality of storage nodes;
   wherein each compute node of the plurality of compute nodes is configured to independently perform at least a storage operation on any of the storage nodes in a persistent manner,
   wherein each storage node of the plurality of storage nodes provides physical storage space of the large-scale storage system,
   wherein the plurality of storage nodes is configured to store mapping information of elements stored in the large-scale storage system, for mapping element identifiers into physical locations, wherein the mapping information is sharded across the plurality of storage nodes, and
   wherein each compute node is configured to communicate with each of the plurality of storage nodes over the communication fabric, and to use the mapping information for accessing the elements, thereby enabling access by each compute node of the plurality of compute nodes to an entire namespace of the large-scale storage system.

2. The system of claim 1, wherein the large-scale storage system is connected to a network to allow access of client devices to the large-scale storage system.

3. The system of claim 2, wherein each of the plurality of compute nodes is configured to receive, from a client device, a request over a first protocol and translate the command to the at least a storage operation to be communicated to one of the plurality of storage nodes over a second protocol of the communication fabric.

4. The system of claim 1, wherein the communication fabric is any one of: an Ethernet fabric and an InfiniBand fabric.

5. The system of claim 4, wherein the communication fabric supports a communication protocol, including any one of: a remote direct memory access (RDMA) over Converged Ethernet (RoCE), an iWARP, and a Non-Volatile Memory Express (NVMe).

6. The system of claim 1, wherein each of the plurality of storage nodes comprise:
   a plurality of solid state persistent drives (SSDs);
   at least one non-volatile random-access memory (NVRAM) for temporary holding data to be written to the plurality of SSDs, thereby reducing a number of write amplification of each SSD; and at least one interface module configured to control the plurality of SSDs and NVRAM and communicate with the plurality of compute nodes.

7. The system of claim 6, wherein the number of SSDs and capacity of each SSD in each storage node is configurable.

8. The system of claim 6, wherein the plurality of SSDs are consumer grade SSDs that are placed in an enclosure having an enterprise grade form factor.

9. The system of claim 6, wherein the at least one interface module further comprises:
a network interface card (NIC) for interfacing with the plurality of compute nodes over the communication fabric; and
a switch to allow connectivity to the plurality of SSDs.

10. The system of claim 9, wherein the compute node is further configured to minimize an amount of unused storage space in the plurality of SSDs, by aggregating data of write requests from a plurality of write requests until a complete data block is ready to be flushed, and storing the complete data block to at least one SSD.

11. The system of claim 6, wherein the compute node is configured to maintain data resiliency with each of the plurality of SSDs.

12. The system of claim 6, wherein the compute node is configured to maintain data resiliency with the plurality of SSDs by writing a data block to a determined number of redundant SSDs.

13. The system of claim 6, wherein the compute node is further configured to compress data prior to writing data to at least one of the plurality of SSDs.

14. The system of claim 1, wherein each compute node of the plurality of compute nodes is any one of: a virtual machine, a software container, and a physical machine.

15. The system of claim 1, wherein the at least a storage operation includes performing a read request.

16. The system of claim 15, wherein the compute node is further configured to:
receive a read request, wherein the read request includes at least an identifier of a data element to be read;
determining a certain shard of the mapping information that includes mapping information for the data element;
determine a location of data blocks, based on the mapping information for the data element, wherein the location is in at least one storage node; and
access the determined location to retrieve the data blocks of the requested element.

17. The system of claim 16, wherein the location within the at least one storage node is any one of: at least one SSD and at least one NVRAM.

18. The system of claim 17, wherein the location is determined using a token, wherein the token is an abstraction representing a pointer to any one of: a data block of data and metadata.

19. The system of claim 1, wherein the at least a storage operation includes performing a write operation.

20. The system of claim 19, wherein the compute node is further configured to:
receive a write request, wherein the write request includes at least a data element to be written;
determine a location to write the received data element, wherein the location is in at least one storage node;
write the data element to a write buffer at the determined location; and
acknowledge a completion of the write request when the writing of the data element to the write buffer is completed.

21. The system of claim 20, wherein the location within the at least one storage node is an NVRAM of each of the at least one storage node.

22. The system of claim 20, wherein the location is determined using a hash table mapping an identifier of the data element to a physical storage destination data block and metadata.

23. The system of claim 20, wherein the compute node is further configured to:
lock the write buffer prior to writing the data element to the write buffer, wherein persistent locks reside on the plurality of storage nodes.

24. A method for performing a write request in a large-scale storage system, comprising:
receiving, by a compute node of a plurality of compute nodes of the large-scale storage system, a write request, wherein the write request includes at least a data element to be written, wherein the large-scale storage system includes the plurality of compute nodes and a plurality of storage nodes, wherein the plurality of storage nodes is configured to store mapping information of elements stored in the large-scale storage system, for mapping elements identifiers into physical locations, wherein the mapping information is sharded across the plurality of storage nodes, and wherein each compute node is configured to communicate with each of the plurality of storage nodes over the communication fabric, and to use the mapping information for accessing the elements, thereby enabling access by each compute node of the plurality of compute nodes to an entire namespace of the large-scale storage system;
determining a location to write the received data element, wherein the location is in at least one storage node of the plurality of storage nodes the large-scale storage system;
writing the data element to a write buffer at the determined location; and
acknowledging a completion of the write request when the writing of the data element to the write buffer is completed.

25. The method of claim 24, further comprising:
locking the write buffer prior to writing the data element to the write buffer.

26. The method of claim 24, wherein determining the location further comprises:
mapping, using a hash table, an identifier of the data element to a physical storage destination data block and metadata.

27. The method of claim 26, wherein the location within the at least one storage node is at least one NVRAM included in the at least one storage node.

28. The method of claim 27, further comprising:
controlling the NVRAM to aggregate data of write requests from a plurality of write requests until a complete data block is ready to be flushed; and
writing the complete data block to at least one solid state persistent drive (SSD) included in the at least one storage node.

29. A non-transitory computer readable medium having stored thereon instructions for causing one or more processing units to execute the method according to claim 24.

30. A method for performing a read request in a large-scale storage system, comprising:

receiving, at a first compute node of a plurality of compute nodes of the large-scale storage system, a read request, wherein the read request includes at least an identifier of a data element to be read, wherein the large-scale storage system includes a plurality storage nodes configured to store mapping information of elements stored in the large-scale storage system, for mapping elements identifiers into physical locations, wherein the mapping information is sharded across the plurality of storage nodes, and
wherein each compute node is configured to communicate with each of the plurality of storage nodes, and to use the mapping information for accessing the elements, thereby enabling access by each compute node of the plurality of compute nodes to an entire namespace of the large-scale storage system;
    determining a certain shard of the mapping information that includes mapping information for the data element;
    determining a location of the data blocks, based on the mapping information for the data element, wherein the location is in at least one storage node of the large-scale storage system; and
    accessing the determined location to retrieve the data blocks of the requested element.

31. The method of claim 30, wherein the location within the at least one storage node is any one of: at least one SSD and at least one NVRAM.

32. The method of claim 30, wherein determining the location further comprises:
    checking a value of a token, wherein the token is an abstraction representing a pointer to any one of: a data block of data and metadata.

33. A non-transitory computer readable medium having stored thereon instructions for causing a processing circuitry to execute the method according to claim 30.

* * * * *